US007845654B2

(12) United States Patent
Price, Jr.

(10) Patent No.: US 7,845,654 B2
(45) Date of Patent: Dec. 7, 2010

(54) SPECIAL BIG 4 WHEELER WHEEL BARROW

(76) Inventor: Lucky W. Price, Jr., 2060 E. 200 S., Anderson, IN (US) 46017

( * ) Notice: Subject to any disclaimer, the term of this patent is extended or adjusted under 35 U.S.C. 154(b) by 312 days.

(21) Appl. No.: 11/507,825

(22) Filed: Aug. 22, 2006

(65) Prior Publication Data

US 2007/0194544 A1    Aug. 23, 2007

Related U.S. Application Data

(60) Provisional application No. 60/776,186, filed on Feb. 23, 2006.

(51) Int. Cl.
 *B62B 3/00*    (2006.01)
(52) U.S. Cl. .................. 280/47.34; 280/47.31
(58) Field of Classification Search ............ 280/652, 280/653, 654, 47.2, 47.3, 47.315, 47.32, 280/47.33, 47.26, 47.27, 47.31, 47.34
 See application file for complete search history.

(56) References Cited

U.S. PATENT DOCUMENTS

| | | | |
|---|---|---|---|
| 717,471 A | 12/1902 | Tanner | |
| 1,340,898 A * | 5/1920 | Keminskis | 280/47.34 |
| 1,735,527 A | 11/1929 | Cwik | |
| 2,598,261 A | 5/1952 | Hrabal | |
| 3,858,929 A | 1/1975 | Brescia | |
| 4,061,349 A | 12/1977 | Stahl | |
| 4,767,128 A | 8/1988 | Terhune | |
| 4,921,305 A * | 5/1990 | Steer | 298/3 |
| 5,031,926 A | 7/1991 | Wannamaker | |
| 5,033,760 A | 7/1991 | Evans | |
| D329,726 S | 9/1992 | Loveless | |
| 5,149,116 A * | 9/1992 | Donze et al. | 280/47.26 |
| 5,350,030 A * | 9/1994 | Mawhinney et al. | 180/19.3 |
| D356,411 S | 3/1995 | Gingras et al. | |
| 5,509,681 A | 4/1996 | Keller | |
| 5,692,761 A | 12/1997 | Havlovitz | |
| 6,220,622 B1 | 4/2001 | Garcia | |
| 6,241,276 B1 * | 6/2001 | Wilburn | 280/659 |
| 6,508,478 B1 | 1/2003 | Ortez | |
| 6,880,852 B2 * | 4/2005 | Lim | 280/653 |
| 7,017,998 B2 | 3/2006 | Ducharme | |
| 2003/0006570 A1 | 1/2003 | Baker | |
| 2003/0015852 A1 | 1/2003 | Swift | |
| 2004/0164509 A1 | 8/2004 | Campbell et al. | |
| 2005/0212237 A1 | 9/2005 | Lin | |

* cited by examiner

*Primary Examiner*—J. Allen Shriver, II
*Assistant Examiner*—Bridget Avery
(74) *Attorney, Agent, or Firm*—Ritchison Law Offices (57) ABSTRACT

An auxiliary wheel assembly mounted on a selected portion of a wheelbarrow comprising: several structural members namely a urethane receptacle barrow, a dual front support and wheel assembly, a rear support and wheel assembly with a plurality of heavy duty wheels, and a means to connect these front and rear assembles and barrow. These members are potentially made of various materials and are designed for Original Equipment offerings or After Market additions to currently produced wheel barrows. The device may have alternative embodiments with various materials and wheel assembly designs.

2 Claims, 6 Drawing Sheets

Fig. 2 C Repeated

SPECIAL BIG 4 WHEELER WHEEL BARROW

CROSS-REFERENCE TO RELATED APPLICATIONS

This application claims the benefit of Provisional Patent Application Ser. No. 60/776,186 filed Feb. 23, 2006 by Lucky W. Price and titled "SPECIAL BIG 4 WHEELER WHEEL BARROW".

FIELD OF INVENTION

This invention relates to special wheel barrows for transporting material, debris, landscape products, concrete, mortar and other items. Particularly this transport wheel barrow device is related to those special transport wheel barrows that have auxiliary wheels and/or tracks built into the device to aid in the ease and improvement of the effort and energy required to move things. This is especially true of the new dual wheel barrow device as compared with standard wheel barrows in the construction and landscape industry. This may be featured on the original equipment or as an after market enhancement.

FEDERALLY SPONSORED RESEARCH

None.

SEQUENCE LISTING OR PROGRAM

None.

BACKGROUND

Field of Invention and Prior Art

The new "SPECIAL BIG 4 WHEELER WHEEL BARROW" described in this specification is an improved four wheeled wheel barrow device that is designed to easily and quickly install on a standard heavy duty wheel barrow and allow that improved combination to augment and increase the capacity for the wheel barrow or at least reduce the energy and effort required to move the loaded wheel barrow.

A. Introduction of the Problems Addressed

Auxiliary devices for most wheel barrows have traditionally focused to install multiple wheels (dual fronts) on the front and continue to rely on the operator to lift and control the load from the rear. This does not relieve the strain or energy required of the operator. For heavy duty wheel barrows used in masonry, concrete and landscape activities, these wheel barrows are very heavy and "push the limit" of control by the operators, especially after a period of prolonged use. What is needed is a device that has dual front and rear wheel support to enable the operator to control and transport heavy loads. The "SPECIAL BIG 4 WHEELER WHEEL BARROW" addresses these limitations and provides a combination unlike other prior art.

B. Prior Art

Historically, there has been some improvements to wheel barrow devices. However, as far as known, there are no wheel barrow devices at the present time which fully meet this need with as few components and superior operation as the present wheel barrow transport device. It is believed that this device is made with fewer parts, of a more durable design, and with much improved support and structural capabilities than any previous heavy duty wheel barrow device.

Examples of prior auxiliary mechanisms for wheelbarrow devices begin with U.S. Pat. No. 717,471 issued to Tanner (1902). This device provided dual wheels built into a wheelbarrow and a brake device. However, it teaches a three wheeled mechanism and does not provide any retrofit kits for existing units. Another U.S. Pat. No. 1,735,527 issued to Cwik (1929) addressed a need for a rear wheel in that it provided a single rear wheel which could be adjusted to varying heights. It did not provide the stability of a two rear wheeled device as the "SPECIAL BIG 4 WHEELER WHEEL BARROW".

Another U.S. Pat. No. 2,598,261 was issued to Hrabal (1952). This taught a light duty wheel barrow with small wheels and extendable handles. This would have limited construction use at best. An auxiliary "flip down" wheel system was taught by U.S. Pat. No. 4,061,349 issued to Stahl (1977). An auxiliary wheel assembly maws mounted on a wheelbarrow including a wheel adapted to be pivoted forwardly and secured in elevated condition when out of operative position. The wheel then could be pivoted rearwardly and support the rear portion of said wheelbarrow in operation. This was a single rear wheel without the stability of the current "SPECIAL BIG 4 WHEELER WHEEL BARROW".

A three wheeled barrow was taught by the U.S. Pat. No. 4,767,128 issued to Terhune (1988). This wheelbarrow construction included a forward wheel assembly, adjustable handles, and a rear wheel trailer unit, and a brake unit. This system has "swivel" rear wheels which was unstable for heavy loads and did not have dual front wheels. Next, an improvement was offered by U.S. Pat. No. 5,031,926 issued to Wannamaker (1991). This taught a removable apparatus for utilizing a wheelbarrow with a garden tractor, wherein an elongate frame rail mounted with wheels to provide a towable cart. Two wheels added stability, but it was not for the same use or have the same configuration as the "SPECIAL BIG 4 WHEELER WHEEL BARROW".

In U.S. Pat. No. 5,033,760 issued to Evans (1991), a method of converting a single wheeled wheel barrow to a dual wheeled wheel barrow is taught whereby an extended axle is attached to the structural longerons by rotating the axle attaching brackets rearwardly upon each associated longeron and affixing a wheel laterally outside each longeron. No mention of rear wheels, single or dual, was taught. In the U.S. Design Pat. No. D 329,726 issued to Travis (1992), a dual front wheel design is shown, but no rear wheels are depicted.

Another towable conversion for a wheel barrow is taught by U.S. Pat. No. 5,509,681 issued to Keller (1996). No mention of front and rear duals are shown or taught. It teaches a kit for converting a wheelbarrow for use as a towed garden cart is especially suited for wheelbarrows of the type comprising a pan supported on diverging beams. The kit comprises rear wheel assemblies mounted to each of the depending legs and a front hitch plate releasably attached to the forward ends of the beams. Another concept of small rear wheels for light duty wheel barrows was shown in U.S. Pat. No. 6,220,622 issued to Garcia (2001). The Rear Wheel System device includes a frame assembly secured to the underside of the tray of a wheelbarrow adjacent the rear end of the tray and a wheel assembly coupled to the frame assembly. The wheel assembly includes a pair of spaced wheels and is adjustable relative to the frame assembly so as to enable a user thereof to raise and lower the rearward portion of the wheelbarrow.

A further U.S. Pat. No. 6,241,276 issued to Wilburn (2001) demonstrates an adjustable wheel set for light duty wheel barrows. An auxiliary wheel assembly permits utilization of a wheel barrow as a wagon. The auxiliary wheel assembly includes support arms adapted for coupling to a wheelbarrow's tangs. The system is light duty and demonstrates use with a single front wheeled barrow. Next, in U.S. Pat. No.

6,508,478 issued to Ortez (2003) teaches a complex yet light dual wheel assembly. An auxiliary wheeled frame is attached to the legs of a typical wheelbarrow. Pivotable, rotating "castor" wheels are attached to the framework. The result for heavy duty operations is an unstable assembly. A complex series of support and cross bars are taught but will not compensate for the "caster" wheel and light duty concept.

In the U.S. Patent Publication 2003/0006570 published for Baker (2003), a wheel barrow having three wheels is disclosed. A forward wheel is positioned adjacent the point of intersection between two convergent longitudinal frame members, and a pair of rearward wheels are disposed intermediately of the forward and rear ends of the longitudinal frame members. Frame members provide a support carriage for a container. Rear wheels are connected by an axle, and rear axle is connected at each end to frame members by downwardly depending bracket members. The three wheeled assembly does not offer the stability for heavy loads as well as the "SPECIAL BIG 4 WHEELER WHEEL BARROW". In the U.S. Patent Publication 2003/0015852 published for Swift (2003), a wheel barrow with a brake apparatus is taught. The system is a three wheeled concept, however the brake could be incorporated into the "SPECIAL BIG 4 WHEELER WHEEL BARROW" if one desires.

U.S. Patent Publication 2004/0164509 published for Campbell (2004) teaches a wheelbarrow comprising a frame, a pair of handles, and a pair of distal support elements. The three-wheeled system also teaches a brake method for a light duty wheel barrow. In U.S. Patent Publication 2005/0212237 published for Lin (2005), another three wheeled apparatus is taught. The wheelbarrow includes a frame, a container, a front wheel assembly, an auxiliary dual rear wheel assembly, and a connecting unit. The auxiliary rear wheel assembly includes a shaft and two auxiliary rear wheels journaled respectively on two opposite ends of the shaft. The connecting unit connects the shaft to the leg unit, and permits the shaft to be detached from the frame.

As far as known, there are no dual wheeled wheel barrow devices at the present time which fully meet the limitations in the field of heavy duty wheel barrows with as few components and superior operation as the present "SPECIAL BIG 4 WHEELER WHEEL BARROW".

SUMMARY OF THE INVENTION

A Special Four Wheeled Wheel Barrow device has been developed for use by a person to move various materials including concrete, mortar, and other materials in an efficient manner. A person normally has to use a standard wheel barrow and exert considerable effort and energy to move various materials in construction, landscaping and other industries. The improved Special Four Wheeled Wheel Barrow device permits the movement of materials in a much easier and ergonomically efficient manner to save both time—cost—and effort (fatigue). Specifically, the Special Four Wheeled Wheel Barrow provides a better way to move materials with a fully supported, wheeled device so that human effort may be significantly reduced.

The preferred embodiment of the device is comprised of several structural members namely a urethane receptacle barrow, a front support and dual wheel assembly, a rear support and dual wheel assembly, and means to connect these front and rear assembles and barrow. These members are potentially made of various materials and are designed for Original Equipment offerings or After Market additions to currently produced wheel barrows. The device may have an alternative embodiment with various materials and wheel assembly designs. While the three main components are securely connected, the means of connection may be from various types of fasteners or from well designed features built-in during the process of manufacturing.

The newly invented Special Four Wheeled Wheel Barrow features very few parts. In operation, the new Special Four Wheeled Wheel Barrow may be assembled and operated with common tools, without the need for special fasteners.

OBJECTS AND ADVANTAGES

There are several objects and advantages of the Special Four Wheeled Wheel Barrow. There are currently no known wheel barrow mechanisms that are effective at providing the objects of this invention.

One advantage and object of the present invention is that it is ergonomically designed. This device enables a worker to carry heavy materials long distances without placing strain and weight on their back, arms or legs. Less strain equates to more energy to complete the job in a faster, more efficient manner. Important is that the need to balance the heavy load is reduced.

Another object for the Special Four Wheeled Wheel Barrow is to provide a device that saves time on jobs and is easier to handle than standard wheelbarrows. The four wheel design, with smaller rear wheels, permits faster and more controlled movement of the materials since the operator is not "straining" to support part of the load. The wheel size between the front and rear permits better balance, no tipping and easier turning of the wheel barrow when filled with a load.

Another object of the present invention is to have low manufacturing costs. This is accomplished by using existing wheel barrow assembly lines and production facilities to make it simple to mass produce. In fact, all production materials and components are readily available on the commercial level.

A further advantaged offered with the Special Four Wheeled Wheel Barrow is that it is designed for durability and unlimited usage. By using durable materials for the barrow and carrying structure with proven, mechanically sound structural designs, the usage and life will be greatly improved as compared to standard wheel barrow designs.

Another advantage expected with the Special Four Wheeled Wheel Barrow is its universal appeal. Appeal to an overwhelming number of people in the construction trade as well as global/international market is likely. The need for ergonomically superior wheel barrows for various usages is not limited to the United States alone. Other countries, regardless of the wage rate, realize the benefit of removing un-needed strain from the workers.

A further advantage is in the product distribution the Special Four Wheeled Wheel Barrow can be sold at or made available through hardware stores, building supply stores, home improvement centers, the Internet, and any retail locations that currently sell wheelbarrows.

Another poignant advantage is that this new device is that it is versatile. The Special Four Wheeled Wheel Barrow may be used in construction, home and garden, landscape, retail stocking, and other industries. It may be used by a professional tradesmen and an untrained do-it-yourselfer (DIY).

Finally, other advantages and additional features of the present Special Four Wheeled Wheel Barrow will be more apparent from the accompanying drawings and from the full description of the device. For one skilled in the art of devices and improvements for moving construction materials and wheel barrow products, it is readily understood that the features shown in the examples with this mechanism are readily adapted to other types of wheel barrow improvements.

DESCRIPTION OF THE DRAWINGS—FIGURES

The accompanying drawings, which are incorporated in and constitute a part of this specification, illustrate an embodiment of the Special Four Wheeled Wheel Barrow that is preferred. The drawings together with the summary description given above and a detailed description given below serve to explain the principles of the Special Four Wheeled Wheel Barrow. It is understood, however, that the Special Four Wheeled Wheel Barrow is not limited to only the precise arrangements and instrumentalities shown.

DESCRIPTION OF THE DRAWINGS—REFERENCE NUMERALS

The following list refers to the drawings:
31 general assembly of the Special Four Wheeled Wheel Barrow
32 front straps to reinforce and connect the frame to the barrow
33 front tire assembly of the Special Four Wheeled Wheel Barrow
34 support structure (extended)
35 rear tire assembly
36L, R rear straps or equivalent
36A integral loop structure on rear straps 36L, R
37 rear axle
38 means to fasten front and rear axle assemblies to barrow
39 barrow receptacle structure
40 handles and support structure
41 initial concept drawing
42 initial disclosure drawing by market firm
43 initial detail drawings by market firm
44 first prototype sample
45 underside of first sample
46 concrete/mortar mixing device
47 worker hauling mortar
48 typical commercial building site
49 end retention for shaft and wheel (cotter key or equivalent over hub washers)
49A . . . hub washers
50 material to be transported
51 rear tang support of typical wheel barrow

Detailed Description of Preferred Embodiment

The present device is a mechanism for a person to transport construction or other materials called a Special Four Wheeled Wheel Barrow 31. The preferred embodiment of the device is comprised of several structural members namely a urethane barrow receptacle, a front support and dual wheel assembly 33, a rear support and dual wheel assembly 35, and means to connect these front and rear assembles and barrow 38. These members are potentially made of various materials and are designed for Original Equipment offerings or After Market additions to currently produced wheel barrows. The device may have an alternative embodiment with various materials and wheel assembly designs. While the three main components are securely connected, the means of connection may be from various types of fasteners or from well designed features built-in during the process of manufacturing. A person having ordinary skill in the field of wheel barrow devices such as these appreciates the various parts that may be used to physically permit this Special Four Wheeled Wheel Barrow 31 to be produced and utilized.

The improvement over the existing art is providing a device that:
a. is ergonomically friendly;
b. saves time and is easier to handle;
c. has a low manufacturing cost;
d. is designed for durability and unlimited usage;
e. has universal appeal for local and international customers;
f. utilizes existing distribution systems;
g. is versatile in use for construction, landscape and other industries;

There is shown in FIGS. 1-6 a complete operative embodiment of the Special Four Wheeled Wheel Barrow 31. In the drawings and illustrations, one notes well that the FIGS. 1-6 demonstrate the general configuration and use of this invention. The preferred embodiment of the device is comprised of only a few parts as shown in the drawings. These structural members or parts are comprised of and include, but are not limited to, a urethane barrow 39, a front support and dual wheel assembly 33, a rear support and dual wheel assembly 35, and means to connect these front and rear assembles and barrow (fasteners, connection means etc or equal)38. Various important features of these member components are delineated in FIGS. 2-6 of the drawings and are described below in appropriate detail for one skilled in the art to appreciate their importance and functionality to the Special Four Wheeled Wheel Barrow 31.

The accompanying drawings, which are incorporated in and constitute a part of this specification, illustrate an embodiment of the Special Four Wheeled Wheel Barrow 31 that is preferred. The drawings together with the summary description given above and a detailed description given below serve to explain the principles of the Special Four Wheeled Wheel Barrow 31. It is understood, however, that the Special Four Wheeled Wheel Barrow 31 is not limited to only the precise arrangements and instrumentalities shown. For example, while four wheels are the preferred embodiment shown, additional wheels might be desired for some applications and still be within the scope and spirit shown here.

Figure 1:
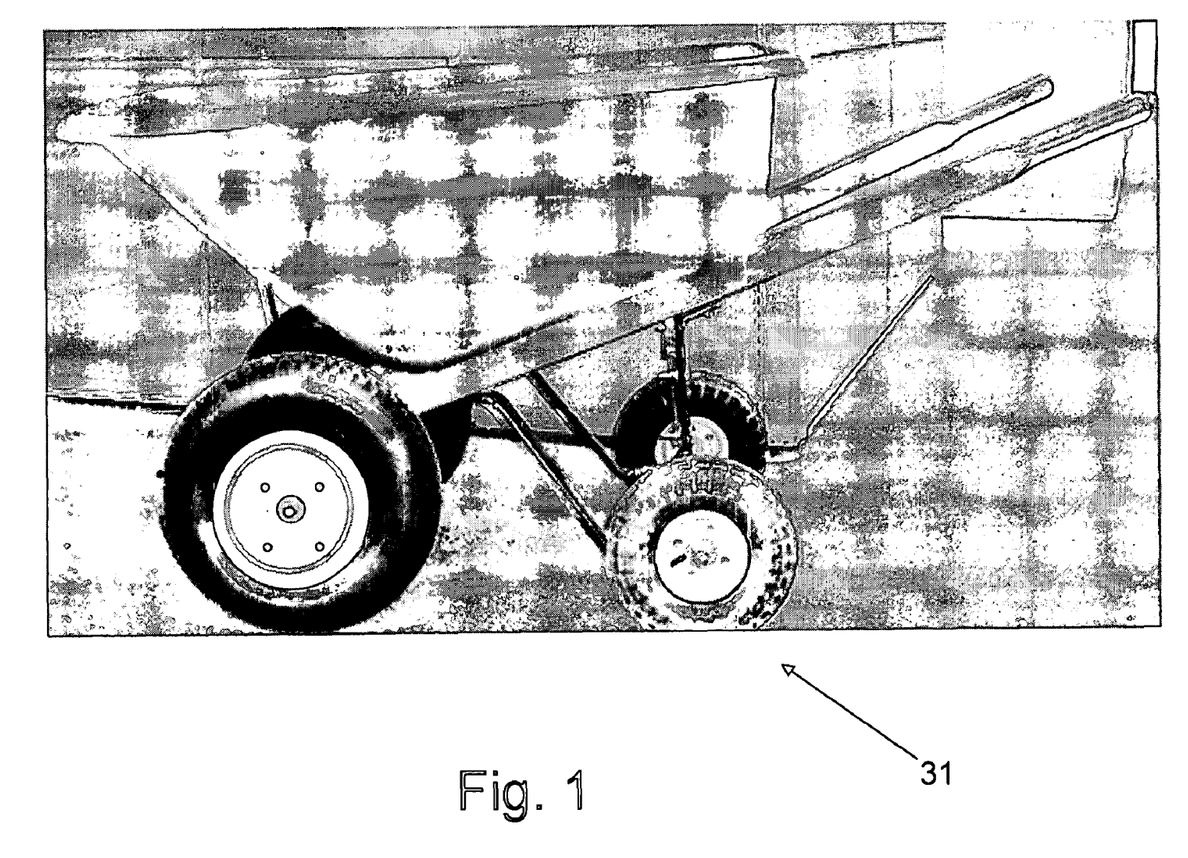
FIG. 1 is a Photograph of the latest prototype assembly of the Special Four Wheeled Wheel Barrow.

FIG. 1 is a Photograph of the latest prototype assembly of the Special Four Wheeled Wheel Barrow 31. Here the full configuration of the new device is fully depicted in the photograph.

Figure 2A:
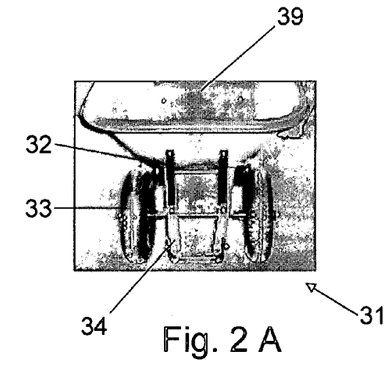
FIGS. 2A through 2E are photographs of the Special Four Wheeled Wheel Barrow with the various components and features noted.

FIGS. 2A through 2E are photographs of the Special Four Wheeled Wheel Barrow 31 with the various components and features noted. FIG. 2A demonstrates a front end view of the Special Four Wheeled Wheel Barrow 31 with the extended support structure 34 for the front tire assembly 33. Additionally the heavier front straps 32 used to replace and reinforce the structure are shown supporting the main barrow receptacle structure 39. One skilled in the art of wheel barrow design and construction appreciates well the plethora of materials that may be used to provide a strong and durable Special Four Wheeled Wheel Barrow 31. In the instant prototype, the replacement stronger and heavier front support straps 32 (for reinforcement to the barrow receptacle which is now capable of carrying much heavier loads) anticipate a metal strap such as steel or an equal strength composite material. The barrow 39 is shown as a heavy duty urethane or polyurethane, yet a metal or composite material that is equal in properties may be utilized. Other components such as the wheels 33 and 35 may be pneumatic or solid type wheels from various rubber or synthetic equals that provide some cushioning or dampening properties with high durability for long life and slow wearing in the construction and landscape environment.

Figure 2B:
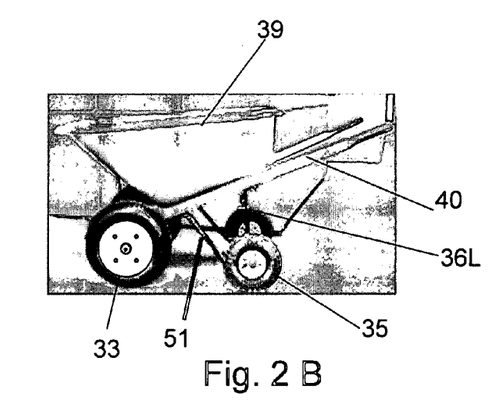

In FIG. 2B the side view of a prototype of the Special Four Wheeled Wheel Barrow 31 is shown. Here the front wheel assembly 33 and rear wheel assembly 35 are demonstrated. They carry the main barrow 39 by means of support including the handles and support structure 40. This structure has been traditionally a hard wood treated for resistance to moisture and weather. One skilled in the art of outdoor tools appreciates well the substitution of composite and urethane materials to accomplish the same weather resistance with high strength properties.

Figure 2C:
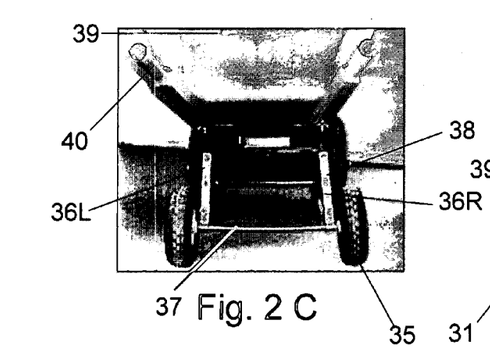

In FIG. 2C, the rear view of the Special Four Wheeled Wheel Barrow 31 is shown. The handle and support structure 40 supporting the barrow receptacle is depicted. Also, the rear straps 36 are shown securely connecting the rear tang support 51 to the rear axle 37. This axle 37 is connected securely to the rear straps 36 by an integral loop 36A. The axle 37 shown is an all-thread metal shaft with full threads the length of the component. This axle 37 may be a metal product such as steel or a composite material of equal physical properties. Likewise, the threaded portion may be restricted to only at the distal ends of the axle 37. Further, a means to connect the axle 37 to the wheel assemblies 33 and 35 may be accomplished in many ways such as by the end retention 49 for shaft and wheel (cotter key or equal) separated from the hub by a hub washer 49A. The prototype Special Four Wheeled Wheel Barrow 31 shows a threaded connection. One skilled in mechanical assemblies such as these wheel assemblies 33, 35 and axle 37 combinations well appreciates the plethora of various connection means. Therefore, the threaded system depicted here is an example and not a limitation to the scope and spirit of the Special Four Wheeled Wheel Barrow 31. The rear straps 36 depicted in this view may be metal or strong composite materials such as a urethane or the like. The means to secure 38 the straps 36 to the rear tangs 51 may be various fastening systems including, for example and not as a limitation, a threaded bolt, washer and nut system; a rivet system; a weldment; or some equivalent connection system. The scope and spirit of this invention does not require the means to connect 38 to be easily replaced (i.e., not a semi-permanent weldment). However, one skilled in assembly techniques recognizes that some connection systems 38 such as threaded components better lend themselves to After Market assemblies whereas a weldment may be more economical for original equipment installations of the Special Four Wheeled Wheel Barrow 31.

Figure 2D:
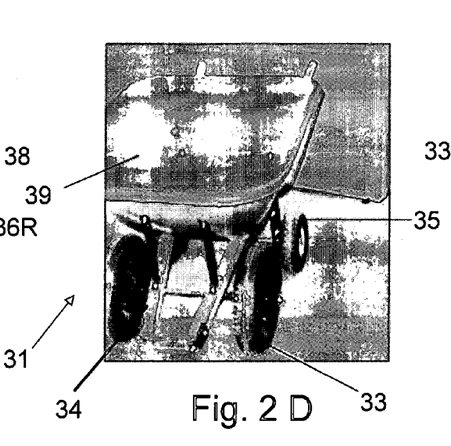
Figure 2E:
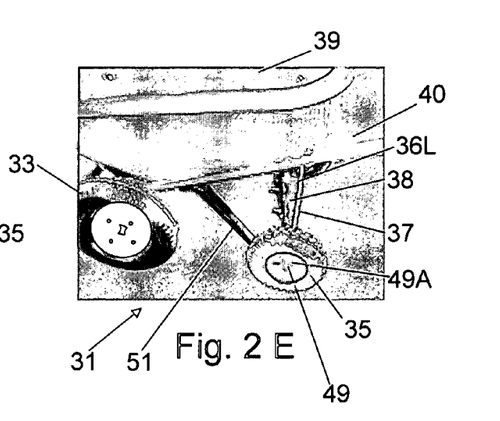

FIG. 2D depicts the prototype Special Four Wheeled Wheel Barrow 31 from a front isometric view. The barrow 39 is shown supported by the structure including the front extension 34 and the front wheel assemblies 33 and rear assemblies 35. Next, a side view FIG. 2E shows the various components, with characteristics as described above, in a larger, up-close view. Noteworthy is the rear tang support of typical wheel barrow 51 which permits attachment of the rear wheel assembly 35 and axle 37 to the structure as described below. Important to the durability is the manner in which the end retention means of the shaft 49 is separated from hub wear by the hub washers 49A, as shown in the photograph.

Figure 3A:
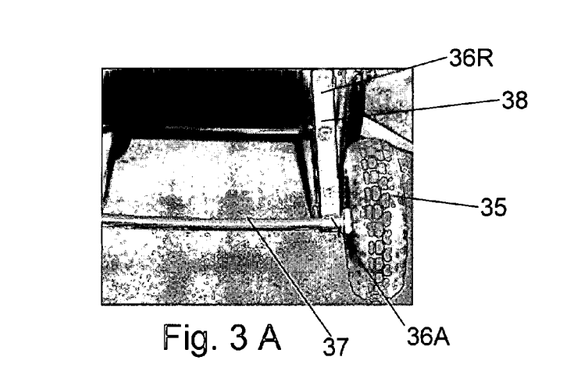
FIGS. 3A through 3C are photographs of the Special Four Wheeled Wheel Barrow with the various components and features noted.
Figure 3B:
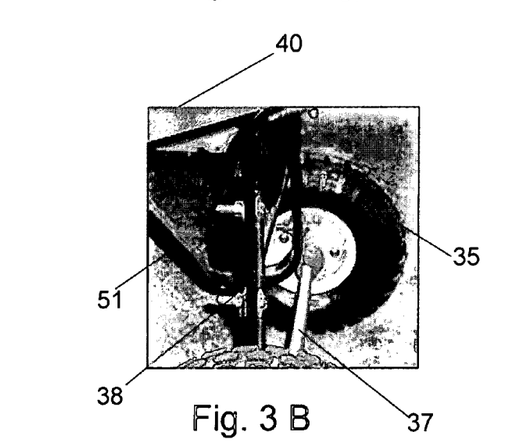
Figure 3C:
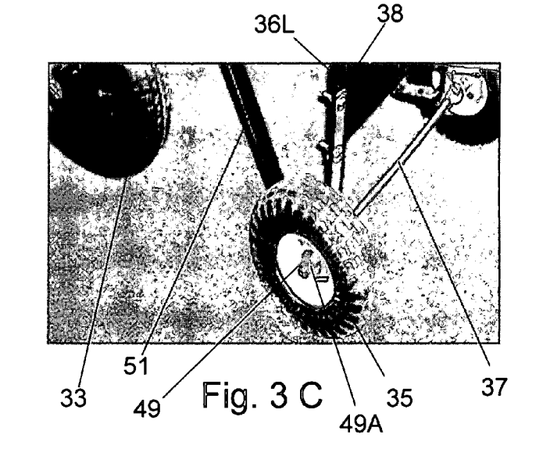

FIG. 3A through 3C are photographs of the Special Four Wheeled Wheel Barrow with the various components and features further noted. In FIG. 3A an up-close rear or end view of the Special Four Wheeled Wheel Barrow 31 shows the rear strap 36 connected to the axle 37 by the means 38. The axle 37 in turn is securely connected to the rear wheel assembly 35 in a configuration that permits the wheel assembly 35 to rotate and turn on the axle 37. A side view depicted in FIG. 3 B shows the same components from a different angle and perspective. The inner hub of the wheel assembly 35 is shown connected to the axle 37. In FIG. 3C, an isometric perspective photograph is shown for the Special Four Wheeled Wheel Barrow 31. Here, the end retention 49 for the shaft/axle 37 and wheel 35 is depicted. This retention 49 may be accomplished in many ways within the scope of this invention. An important feature is the hub washer 49A which helps with the retention yet minimizes wear from the retention means 49 and the hub.

Figure 4:
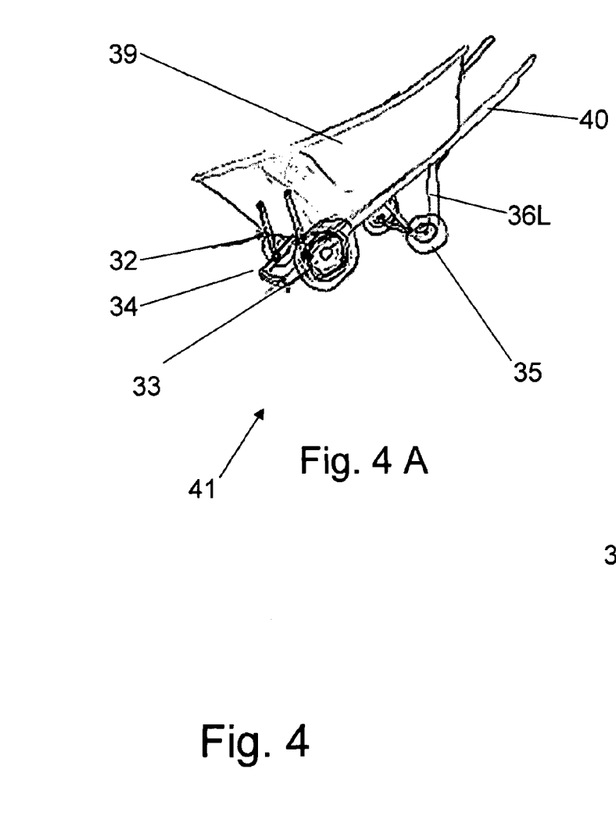
FIGS. 4 including 4A through 4C are sketches of the original concepts and improvements to the Special Four Wheeled Wheel Barrow 31.

FIGS. 4 including 4A through 4C are sketches of the original concepts and improvements to the Special Four Wheeled Wheel Barrow 31. In FIG. 4A the initial concept drawing 41 is provided. While only a rough sketch, it was the start of the diligent efforts to develop the Special Four Wheeled Wheel Barrow 31. In FIG. 4B, the initial disclosure drawing 42 provided by a marketing firm is shown as part of the development in the process. Finally, somewhat detailed renditions and isometric sketches 43 are shown in FIG. 4C.

Figures 5, 5C, 5D:
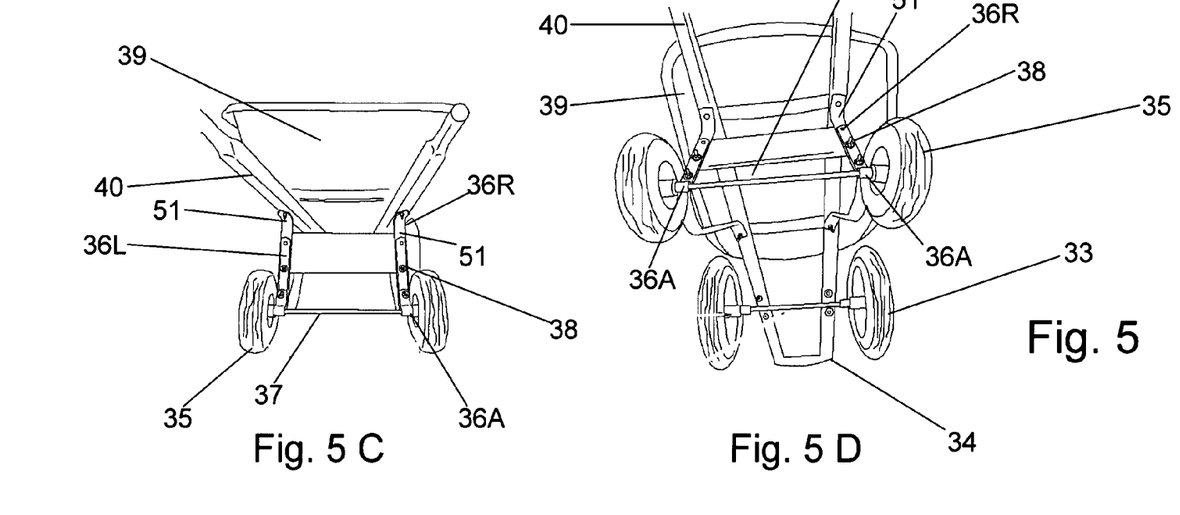
Figure 5A:
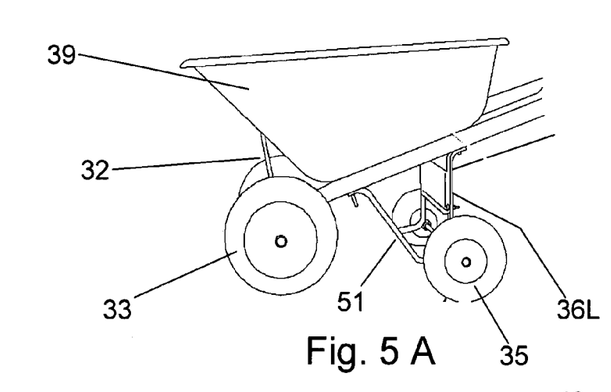
FIGS. 5A, B, C, and D are drawings of a typical Special Four Wheeled Wheel Barrow now available in the U.S. market.
Figure 5B:
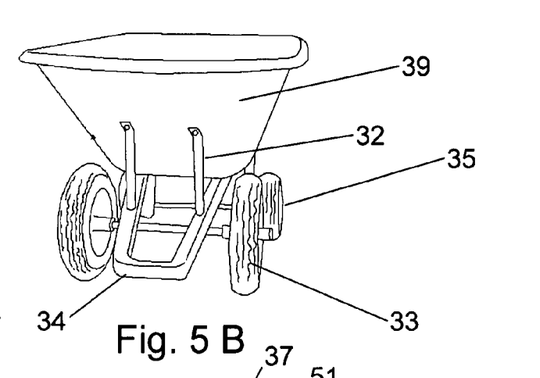

FIGS. 5A, B, C, and D are more formal drawings of a typical Special Four Wheeled Wheel Barrow 31 now available in the U.S. market. In FIG. 5A, a side view shows the above described barrow 39 on the structure 40 with the reinforcing straps 32 (front), 36 (rear) and rear tang support 51. All are inter-connected and configured on the wheel assemblies 33 and 35. In FIG. 5B an isometric drawing shows the Special Four Wheeled Wheel Barrow 31 with the same components and the front extension 34 for supporting the front wheel assembly 33. FIG. 5C is a back or rear view of the configuration showing the barrow receptacle, rear tang support 51, handle support 40, rear straps 36 (with integral loop 36A) and connection means 38 as well as the axle 37 and rear wheel assembly 35. In the underneath or bottom view shown in FIG. 5D, all the aforementioned components are again depicted for clarity of the full configuration.

Operation Of the Preferred Embodiment

The new Special Four Wheeled Wheel Barrow 31 has been described in the above embodiment. The manner of how the device operates is described below. One notes well that the description above and the operation described here must be taken together to fully illustrate the concept of the Special Four Wheeled Wheel Barrow 31. The embodiment described above is essentially a mechanism composed of a urethane barrow 39; front support and wheel assembly 33; a rear support and wheel assembly 35; and a means to connect these front and rear assemblies (33 and 35) and barrow 39. The preferred embodiment of the device is shown in FIG. 1. Alternative devices with some modifications as to the length and height of components and specific connection means are well within the spirit and scope of the Special Four Wheeled Wheel Barrow 31.

Referring back to FIGS. 5A through D one skilled in manufacturing appreciates that all the features may be built into the Special Four Wheeled Wheel Barrow 31 during the original build of the product. At that time of production, the process of connecting the rear wheels 35 may be added to the other existing production processes to enable a typical or standard wheel barrow device to have the rear wheel 35 features or option.

Additionally, the configuration described above permits the Special Four Wheeled Wheel Barrow 31 to be added to existing wheel barrows to enable them to have the rear wheel 35 features. One skilled in After Market assembly appreciates well the ease of adding the front straps 32 for increased strength of the barrow receptacle 39. This is required since the Special Four Wheeled Wheel Barrow 31 permits an operator or worker 47 to push and to transport relatively heavier loads when compared to a typical wheel barrow configuration which requires the worker 47 to "lift and balance" from the handles 40. In addition to the front reinforcement straps 32, the rest of the added assembly is at the rear of the Special Four Wheeled Wheel Barrow 31 as shown well in FIGS. 5C and D. The rear straps 36 are affixed securely by a connection means 38 to the wheel barrow support 51 and to the axle 37 by the integral loop 36A. The axle 37 is secured to the wheels 35 by the end retention 49 for shaft and wheel (cotter key or equal) and the hub protecting washer 49A. One understands how the aftermarket version of the Special Four Wheeled Wheel Barrow 31 may be simply added to a typical wheel barrow without rear wheels by a simple connection 38 (such as a threaded nut and bolt and washer or an equal connection system) with ordinary tools. In fact, many typical wheel barrels have apertures already in the rear tang support 51. If not, a simple hand drill and bit can provide an aperture to permit a connection from the straps 36 to the tangs 51.

Figure 6:
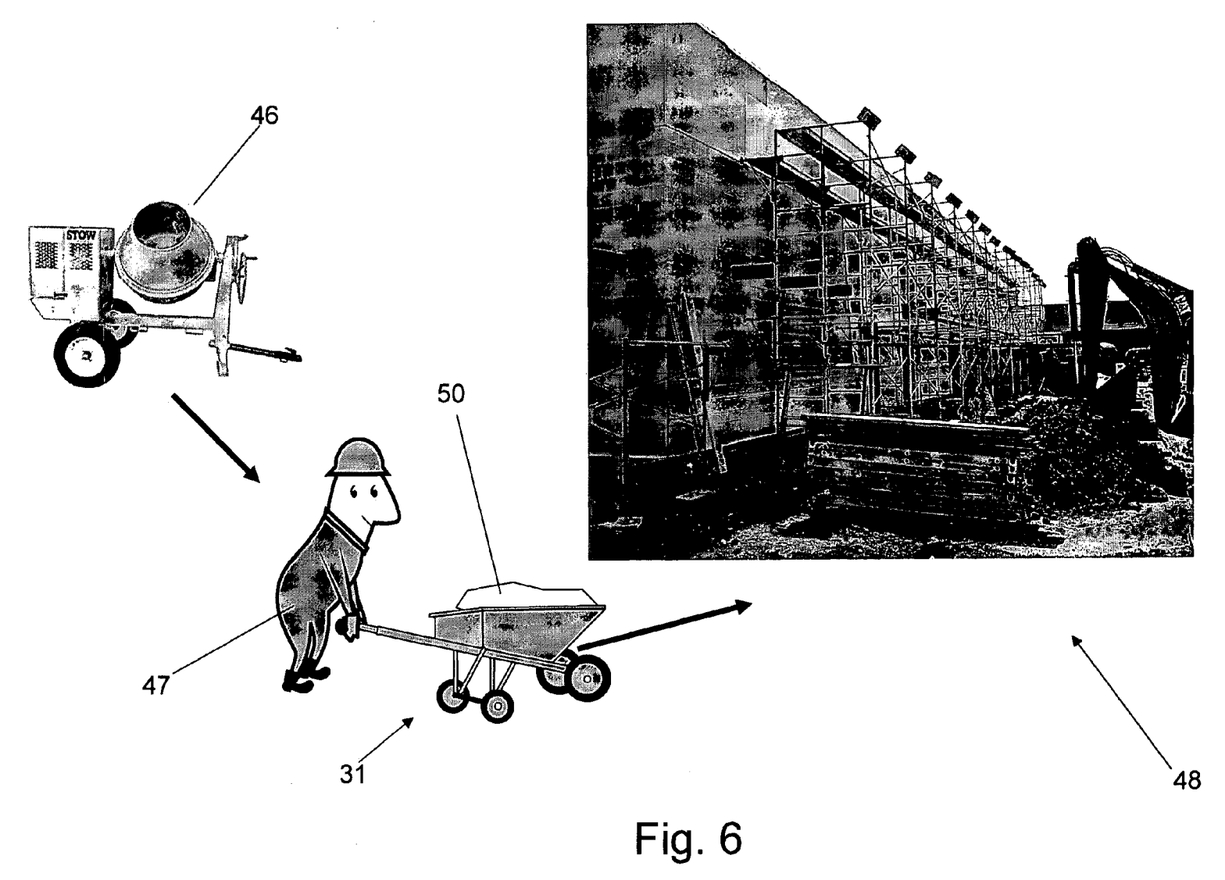
FIG. 6 is a set of sketches and photographs showing the use of a Special Four Wheeled Wheel Barrow with a building site such as a commercial building.

FIG. 6 is a set of sketches and photographs showing the use of a Special Four Wheeled Wheel Barrow 31 with a building site such as a commercial building. Here, the use and operation is readily understood. An operator 47 fills the Special Four Wheeled Wheel Barrow 31 with some material 50 such as the mortar or concrete needed for construction. The operator 47 obtains the material 50 from a mixing device 46. The operator 47 then pushes the Special Four Wheeled Wheel Barrow 31 with the material 50 to wherever it is needed at the commercial building site 48. By virtue of the Four (4) wheels, all the advantages and benefits listed above are accomplished. The various uses and benefits are well understood by those skilled in mobile containers for transport as depicted here. For example, and not limitation, this new Special Four Wheeled Wheel Barrow 31 may be used in construction, landscape, home and garden, agriculture, and many other ways to improve the ease and safety of transporting materials by humans. Likewise, the barrow configuration might be replaced by another platform or other mechanical fixture to utilize the benefit of the big four wheels with manners to haul other materials and still be within the scope of this invention.

With this description it is to be understood that the Special Four Wheeled Wheel Barrow 31 is not to be limited to only the disclosed embodiment. The features of the Special Four Wheeled Wheel Barrow 31 are intended to cover various modifications and equivalent arrangements included within the spirit and scope of the description.

What is claimed as new and desired to be protected by Letters Patent is:

1. A 4-wheeled manually operated wheelbarrow device comprising: a receptacle barrow; a front wheel assembly, comprising: a first front wheel, a second front wheel and a front axle; first and second rear supports; a rear wheel assembly, comprising: a first rear wheel and a second rear wheel; two handles running rearwardly of said barrow; first and second front supports, and said first and second rear supports connected to said handles; said first and second front supports rotatably connecting said front axle to said handles; a rear wheel assembly connection means to rotatably connect the first and second rear wheels to said first and second rear supports, said first and second rear supports each having a substantially angled front portion towards the front of the barrow and a substantially vertical portion facing the rear of the barrow; the rear wheel assembly connection means comprising: first and second vertical straps; a means to fasten the first and second vertical straps securely and singularly to the substantially vertical portion of the respective first and second rear supports; a rear axle extending through an integral bearing means of each of the first and second rear wheels; an integral loop manufactured into an end of each of the vertical straps for encircling the rear axle and connecting the rear axle to the respective vertical strap; two hub washers, each on the exterior outer side of one of the rear wheels; a means to retain each of the hub washers movably on the axle; the first and second rear wheels are enlarged and heavy duty; and the axial distance between the first and second rear wheels is equal to or greater than the axial distance between the first and second front wheels.

2. The 4-wheeled manually operated wheelbarrow device according to claim 1 further comprising a pair of heavy duty front reinforcement straps, said front reinforcement straps connecting a front portion of the barrow to a forward portion of each of said rearwardly running handles and thereby providing support to the barrow for heavy loads enabled by the 4-wheeled structure.

* * * * *